United States Patent [19]
Fateley et al.

[11] Patent Number: 5,488,474
[45] Date of Patent: Jan. 30, 1996

[54] HADAMARD PHASING IN A MULTISOURCE ARRAY

[75] Inventors: William G. Fateley; Radoslaw Sobczynski, both of Manhattan, Kans.

[73] Assignee: D.O.M. Associates Int'l., Manhattan, Kans.

[21] Appl. No.: 238,916

[22] Filed: May 6, 1994

[51] Int. Cl.$^6$ ...................................... G01J 3/28
[52] U.S. Cl. ............................ 356/326; 356/328
[58] Field of Search ...................... 356/326, 328, 356/310, 329, 330–334, 302, 305, 73, 432; 250/553

[56] References Cited

U.S. PATENT DOCUMENTS 5,257,086  10/1993  Fateley et al. ..................... 356/328

OTHER PUBLICATIONS

Trutna, Jr. et al.; Research on External–Cavity–Lasers; Feb. 1993; Hewlett–Packard Journal.
Fallahi et al.; Grating Demultiplexer Integrated with MSM Detector Array in InGaAs/AlGaAs/GaAs For WDM; IEEE Photonics Technology Letters, vol. 5, No. 7, Jul. 1993.
Jungerman et al.; Dual–Output Laser Model for a Tunable Laser Source; Feb. 1993, Hewlett–Packard Journal; pp. 32–34.
Ishak et al.; Photonic Technology for Lightwave Communications Test Applications; Feb. 1993, Hewlett–Packard Journal, pp. 6–10.
Muller et al.; External–Cavity Laser Design and Wavelength Calibration; Feb. 1993; Hewlett–Packard Journal; pp. 20–27.

Primary Examiner—Vincent P. McGraw
Assistant Examiner—K. P. Hantis
Attorney, Agent, or Firm—Hovey, Williams, Timmons & Collins

[57] ABSTRACT

An apparatus and method for minimizing the amplitude range in a time domain signal incorporating a plurality of periodic electromagnetic waves. One embodiment of the invention is a spectrophotometer or polychromatic light transmitter including an array of light emitting diodes or lasers configured for activation in successive encodement patterns, a diffraction grating, an optical slit, a detector and electronic controls including a computer. In operation, the periodic waves driving the diodes or lasers and their phases are adjusted in accordance with Hadamard mathematics in order to minimize constructive and destructive interference between the electromagnetic waves generated by the diodes array. The resulting time domain signal received at the detector is Fourier transformed to the desired spectral space. The invention effectively eliminates centerbursts in the resulting interferogram.

33 Claims, 4 Drawing Sheets

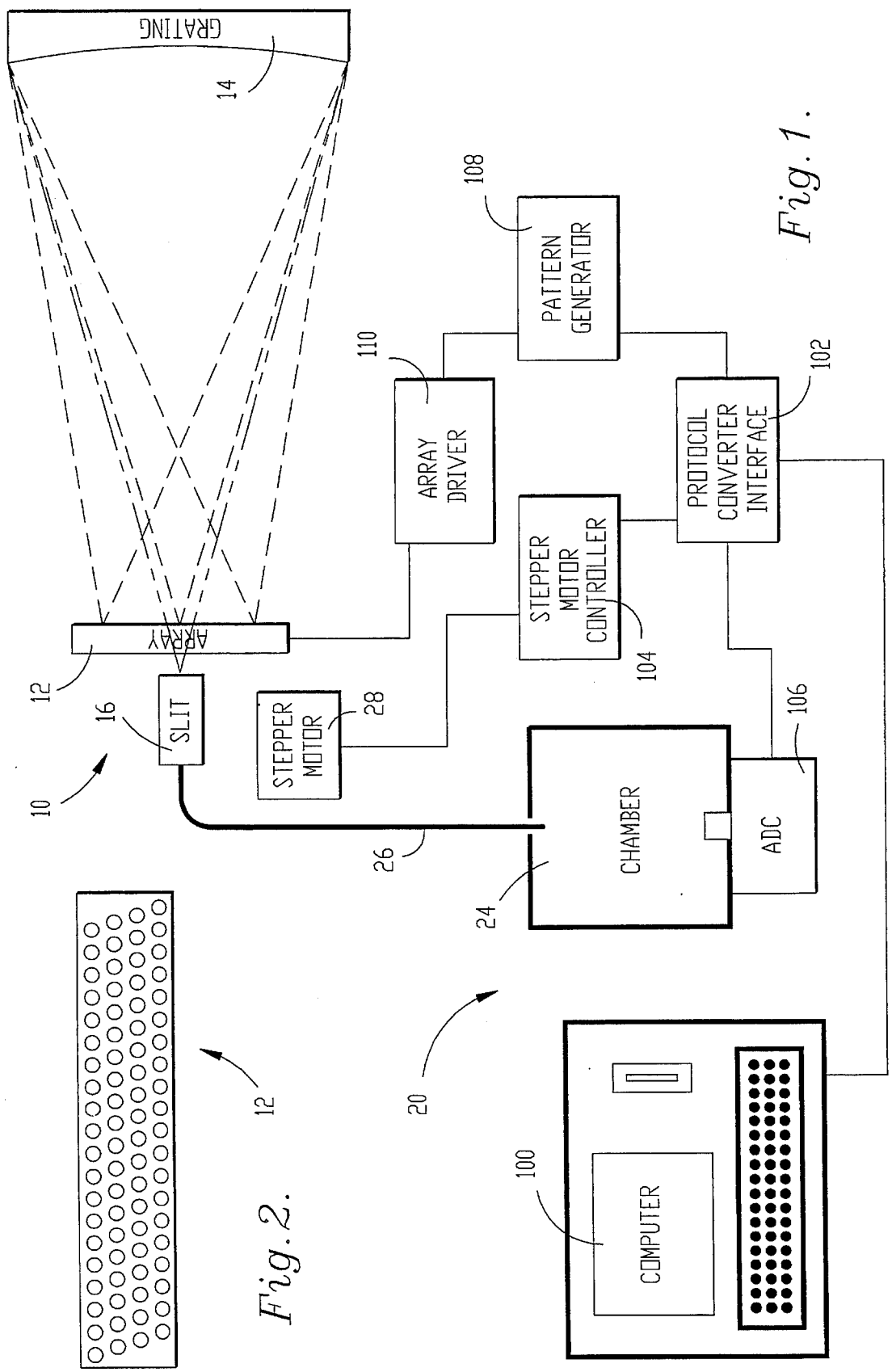

f — frequency
t — time
Φ — phase = 180°
y — diode driving signals

| | |
|---|---|
| 0 | $y_1(t)=\sin(2\pi f_1 t+0\Phi)$ |
| 0 | $y_2(t)=\sin(2\pi f_2 t+0\Phi)$ |
| 0 | $y_3(t)=\sin(2\pi f_3 t+0\Phi)$ |
| 0 | $y_4(t)=\sin(2\pi f_4 t+0\Phi)$ |
| 1 | $y_5(t)=\sin(2\pi f_5 t+1\Phi)$ |
| 0 | $y_6(t)=\sin(2\pi f_6 t+0\Phi)$ |
| 0 | $y_7(t)=\sin(2\pi f_7 t+0\Phi)$ |
| 1 | $y_8(t)=\sin(2\pi f_8 t+1\Phi)$ |
| 0 | $y_9(t)=\sin(2\pi f_9 t+0\Phi)$ |
| 1 | $y_{10}(t)=\sin(2\pi f_{10} t+1\Phi)$ |
| 1 | $y_{11}(t)=\sin(2\pi f_{11} t+1\Phi)$ |
| 0 | $y_{12}(t)=\sin(2\pi f_{12} t+0\Phi)$ |
| 0 | $y_{13}(t)=\sin(2\pi f_{13} t+0\Phi)$ |
| 1 | $y_{14}(t)=\sin(2\pi f_{14} t+1\Phi)$ |
| 1 | $y_{15}(t)=\sin(2\pi f_{15} t+1\Phi)$ |
| 1 | $y_{16}(t)=\sin(2\pi f_{16} t+1\Phi)$ |
| 1 | $y_{17}(t)=\sin(2\pi f_{17} t+1\Phi)$ |
| 1 | $y_{18}(t)=\sin(2\pi f_{18} t+1\Phi)$ |
| 0 | $y_{19}(t)=\sin(2\pi f_{19} t+0\Phi)$ |
| 0 | $y_{20}(t)=\sin(2\pi f_{20} t+0\Phi)$ |
| 0 | $y_{21}(t)=\sin(2\pi f_{21} t+0\Phi)$ |
| 1 | $y_{22}(t)=\sin(2\pi f_{22} t+1\Phi)$ |
| 1 | $y_{23}(t)=\sin(2\pi f_{23} t+1\Phi)$ |
| 0 | $y_{24}(t)=\sin(2\pi f_{24} t+0\Phi)$ |
| 1 | $y_{25}(t)=\sin(2\pi f_{25} t+1\Phi)$ |
| 1 | $y_{26}(t)=\sin(2\pi f_{26} t+1\Phi)$ |
| 1 | $y_{27}(t)=\sin(2\pi f_{27} t+1\Phi)$ |
| 0 | $y_{28}(t)=\sin(2\pi f_{28} t+0\Phi)$ |
| 1 | $y_{29}(t)=\sin(2\pi f_{29} t+1\Phi)$ |
| 0 | $y_{30}(t)=\sin(2\pi f_{30} t+0\Phi)$ |
| 1 | $y_{31}(t)=\sin(2\pi f_{31} t+1\Phi)$ |

*Fig. 6.*

HADAMARD PHASING IN A MULTISOURCE ARRAY

BACKGROUND OF THE INVENTION

1. Field of the Invention

The present invention relates to the field of optics and, more particularly, to spectrometric devices. Still more specifically, the invention relates to an apparatus and method for minimizing or eliminating statistical centerbursts or amplitude peaks in a multiplexed signal incorporating a plurality of periodic electromagnetic waves, such centerbursts resulting from constructive and destructive interference between the waves.

2. Description of the Prior Art

Optical spectrometric devices for measuring the distribution of light over a spectrum are well known in the art, and one class of preferred spectrophotometer devices of this character employ Hadamard multiplex techniques to elucidate the data developed during analysis. The book "Hadamard Transform Optics" by Martin Harwit, et al., published by Academic Press in 1979, provides an excellent overview of Hadamard mathematics and the degree to which common optical components are used in Hadamard spectroscopy and imaging applications; this book is incorporated by reference herein.

One type of prior art spectrophotometers use various masking devices to separate a beam of light into its spectral components for Hadamard or Fourier encoding. These prior art masking spectrophotometers are not sufficiently accurate because of signal loss experienced through mask absorption. Later, an improved spectrophotometer was developed which decreased the signal loss associated with masking spectrophotometers. Fateley U.S. Pat. No. 5,257,086, hereby incorporated by reference, discloses an optical spectrophotometer having a multi-element light source. The '086 patent provided a significant advance in the art of spectrophotometers by replacing electrically alterable masks with an electromagnetic radiation source array activated in accordance with Hadamard or Fourier transform mathematics to produce a plurality of multiplexed encodement patterns. The '086 patent discloses an electromagnetic radiation source array composed of a plurality of solid state source elements configured for allowing activation in a plurality of multiplexing encodement patterns, a detector for detecting radiation emitted from the elements and for producing signals representative thereof, and electronic controls for activating the array patterns and for producing multiplex analyses of the signals.

While the '086 patent provided a significant advance in the state of the art, problems still remain. For example, the output of spectrophotometers utilizing a source array for producing a pattern of electromagnetic waves suffer from centerbursts which degrade the performance of the spectrophotometer. Centerbursts are amplitude peaks in the multiplexed signal caused by constructive interference between the plurality of electromagnetic waves, and are statistically predictable. Centerbursts commonly occur in the output signal when the source elements are activated at the same phase or when the phases of all the source elements become momentarily equal. The amplitude of centerbursts can be very large and can saturate the detector or exceed the dynamic range of other electrical controls such as analog-to-digital converters. Moreover, when all of the source elements are energized simultaneously, the current draw on the power supply is maximized, often exceeding the output of the power supply.

One prior art solution to the centerburst problem is to use detectors with a higher detection range and power supplies with greater output capabilities. Although this straightforward solution prevents saturation of the equipment, it does so at the expense of sensitivity and economy. Detectors which can accurately measure large amplitude signals are ineffective at accurately measuring small signals. Since spectrophotometer applications require the measurement of small radiation signals, high range detectors are not suitable for these devices. Similarly, larger power supplies are a disadvantage due to their increased cost and power requirements.

Another prior art effort to solve the centerburst problem is discussed in an article by Alan G. Marshall entitled "Fourier Transforms in NMR, Optical and Mass Spectrometry." Marshall advocates a random phase variation in the source signals of different frequency, so that the source signals are initially out of phase. The phase variation is accomplished by inserting an optical element into the beam path which randomly disperses the zero-phase positions of signals and effectively "spreads out" the centerburst. Although random phase variation techniques somewhat reduce the centerburst problem, amplitude peaks still occur. More seriously, this technique introduces a barrier to the source signals and causes signal attenuation. Signal attenuation is one of the prior art problems addressed by the previously issued Fately '086 patent.

There is accordingly a need in the art for improved method and apparatus, especially in the context of spectrophotometry, which substantially minimizes or eliminates the centerburst problem without concomitant decreases in sensitively or increased signal attenuation.

SUMMARY OF THE INVENTION

The present invention solves the prior art problems discussed above and provides a distinct advance in the state of the art.

The invention is founded upon the discovery that centerbursts in multiplexed signals can be reduced by selectively adjusting the relative phasing of the plurality of electromagnetic waves in a predetermined pattern before multiplexing. In one preferred application of the invention, a spectrophotometer and method of operation is provided for determining certain physical characteristics of a sample of material by analyzing the spectrum of light passing therethrough. The spectrophotometer utilizes the above-described discovery to alter the relative phasing of its source elements to produce a detector output signal free of excessive amplitude peaks and centerbursts. The invention also provides for a spectrophotometer for performing a very rapid analysis of a sample using Hadamard or Fourier transform techniques without experiencing signal loss through mask absorption.

The present invention broadly includes an electromagnetic radiation source array configured for activation in a plurality of multiplexing encodement patterns, a detector for detecting radiation emitted from the elements and for producing signals representative thereof, and electronic controls for activating the array patterns and for producing multiplex analyses of the signals. More particularly, the electronic controls incorporate circuitry for selectively activating the source elements in a plurality of sequential encodement patterns including circuitry for selectively adjusting the relative phasing of the elements in order to eliminate centerbursts associated with constructive interference between the source element signals.

BRIEF DESCRIPTION OF THE DRAWING AND FIGURES

FIG. 1 is a block diagram of the preferred spectrophotometer apparatus of the present invention;

FIG. 2 is a front elevational view of the preferred source array;

FIG. 6 is a table of the elements of a 31×31 Hadamard matrix.

DETAILED DESCRIPTION OF THE PREFERRED EMBODIMENT

Figure 3:
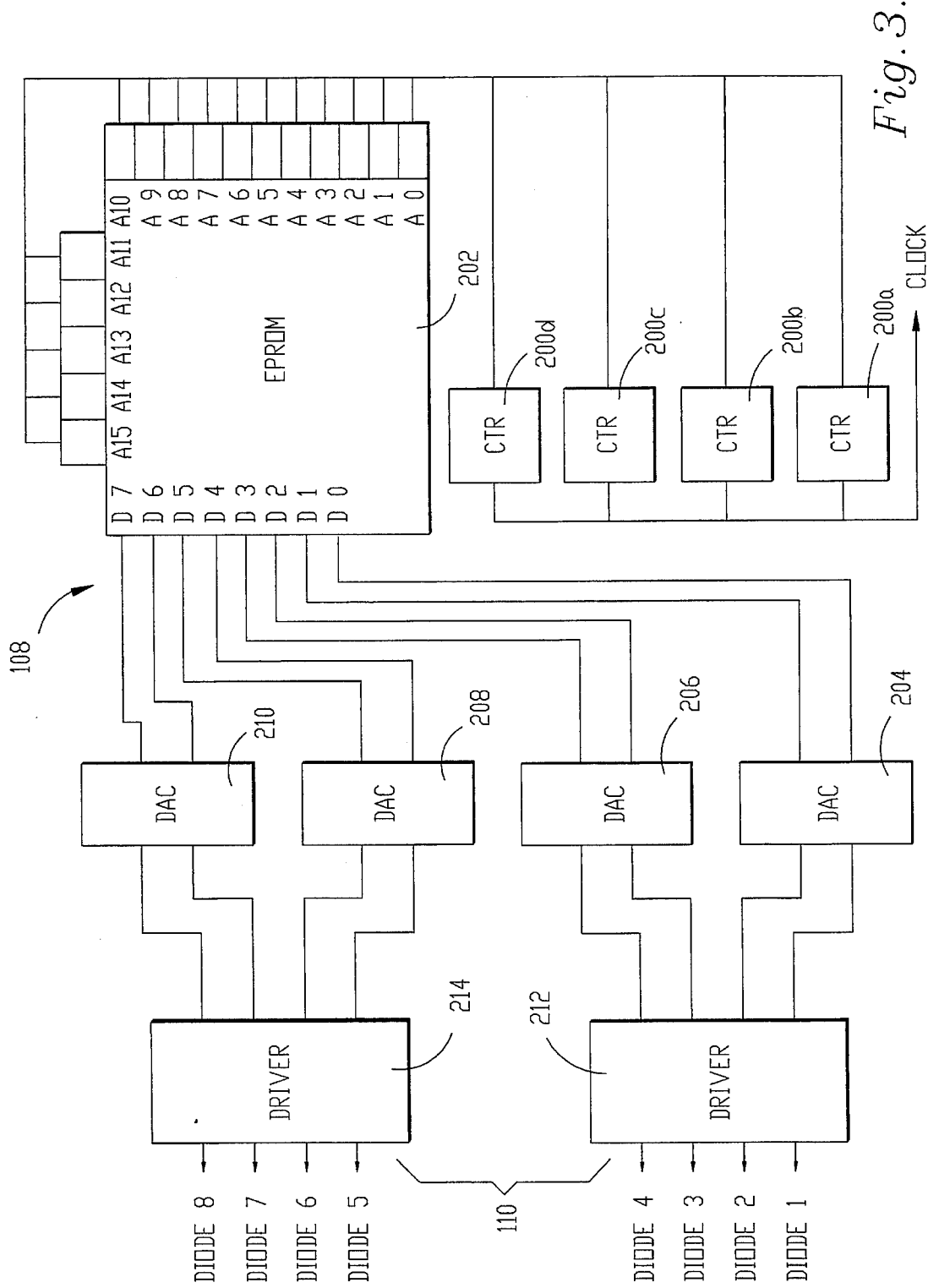
FIG. 3 is an electrical block diagram of the pattern generator and array driver of FIG. 1.

FIG. 1 schematically illustrates the preferred spectrophotometer apparatus 10 which broadly includes radiation source array 12, diffraction grating 14, output slit assembly 16, detector 18 and control assembly 20.

Preferred array 12 includes a plurality of light-emitting diodes (LED) 22 arranged in off-set rows as illustrated in FIG. 2. Light emitting diodes 22 are generally solid state devices constructed from various percentage alloy compositions to produce light of certain wavelengths. As those skilled in the art will appreciate, diodes 22 are selected according to the wavelengths required to produce the desired spectrometric analysis. As those skilled in the art will also appreciate, light-emitting lasers may be substituted for diodes 22.

Diffraction grating 14 is of a concave, aberration corrected, holographic construction available from American Holographic of Littleton, Massachusetts. Grating 14 has a concave gold or aluminum covered reflective focal surface that incorporates very fine rulings for monochromating and collimating light.

Slit assembly 16 is positioned below array 12 and includes a slit body with an optical slit defined therein, and structure defining an optical chamber 24 for receiving a sample material to be analyzed. Conventional fiber optic cable bundle 26 extends from slit assembly 16 to chamber 24 and is configured for delivering optical signals thereto as described in detail below.

Preferred detector 18 is a lead sulfide photoresistor available from Infrared Associates, Inc. of Orlando, Fla., or Epitaxx, Inc. of Princeton, N.J. Other suitable detectors include a silicon photodiode or photovoltaic cell, an indium gallium arsenide phosphide photodiode or photovoltaic cell, or a phototransistor. In operation, detector 18 produces a voltage signal in response to and representative of the radiation impinging thereon.

Stepper motor 28 includes an output shaft, whereby activation of the output shaft shifts the slit body and the slit so that a different set of radiation wavelengths are received therethrough. Thus, by selective controlled activation of motor 28, the set of wavelengths impinging upon detector 18 can be varied to suit the particular analyses being performed.

Referring now to FIG. 1, control assembly 20 includes computer 100, interface 102, stepper motor controller 104, analog-to-digital converter (ADC) 106, Hadamard or Fourier pattern generator 108, and array driver 110.

Computer 100 is a conventional, IBM compatible personal computer with a 486 type microprocessor. Conventional interface 102 operates as a protocol converter enabling communications between computer 100 and devices 104–110.

Conventional stepper motor controller 104 receives signals from computer 100 by way of interface 102 and converts these signals into a format suitable for activating stepper motor 28 to rotate the desired number of steps in order to position slit 16 for passage of the desired wavelengths.

ADC 106 is a conventional analog-to-digital converter which receives the voltage signals from detector 18, amplifies these signals as analog inputs to the converter, and produces a digital output representative of these analog voltage signals.

As illustrated in FIG. 3, pattern generator 108 and array driver 110 include apparatus for driving the elements of source array 12 and for selectively adjusting the relative phasing of diodes 22. In response to control signals from computer 100, generator 108 delivers signals representative of successive encodement patterns to driver 110. More particularly, generator 108 produces output signals to driver 110 indicating which of diodes 22 should be active during a particular encodement pattern and the phase of the activated diodes.

FIG. 3 illustrates a pattern generator 108 and array driver 110 configured for controlling 8 diodes. As those skilled in the art will appreciate, additional diodes can be controlled by simply duplicating the circuitry shown in FIG. 3. The preferred pattern generator 108 includes a plurality of counters 200a, 200b, 200c, and 200d, an EPROM memory device 202, and a plurality of digital-to-analog converters 204, 206, 208, and 210. Array driver 110 includes a plurality of operational amplifiers 212 and 214.

Counters 200a–d are conventional digital flip-flop circuits coupled to the clock output of computer 100. As illustrated in FIG. 3, counters 200a–d are wired in parallel and are configured for generating a 4-bit address value for accessing the memory of EPROM 202. The inputs of counters 200a–d are coupled to the clock of computer 104 which outputs a clock pulse. The clock increments the 4-bit address value of counters 200a–d with each clock pulse, thus generating the address values for accessing address inputs $A_0$– $A_{15}$ in EPROM 202.

EPROM 202 is a conventional electrically programmable read-only memory chip configured for storing and generating the various Hadamard or Fourier transform encodement patterns for activating diodes 22 of array 12. EPROM 202 has 16 addressable memory channels accessed by counters 200a–d as discussed above and eight digital data output lines for generating driving patterns for eight diodes. Each of the memory channels stores 1/16 of the digital data needed to drive one diode, thus a full data point for each diode is generated after 16 clock pulses of computer 100. As discussed in detail below, EPROM 202 stores the frequency, amplitude and phase of the sinusoidal signal for each diode and outputs a digital driving signal to digital-to analog converters 204, 206, 208, and 210. In order to eliminate centerbursts associated with constructive interference between the source element signals, EPROM 202 adjusts the relative phasing of the diodes.

Digital-to-analog converters 204, 206, 208, and 210 are conventional solid state converters coupled to the outputs of EPROM 202 and the inputs of array driver 110. In the preferred embodiment, each converter 204, 206, 208, and 210 is a 2-channel converter configured for receiving digital data from two data lines of EPROM 202 and converting it to two analog driving signals to be delivered to array driver 1! 0.

Converter 204 receives digital data from EPROM 202 representative of the frequency, amplitude and phase of the driving signals for diodes 1 and 2. Converter 206 receives digital data representative of the frequency, amplitude and phase of the driving signals for diodes 3 and 4. Converter 208 receives digital data representative of the frequency, amplitude and phase of the driving signals for diodes 5 and 6. Finally, converter 210 receives digital data representative of the frequency, amplitude and phase of the driving signals for diodes 7 and 8. Each converter converts the received digital data to an analog sinusoidal signal and outputs the signal to array driver 110.

Array driver 110 includes a plurality of operational amplifiers 212 and 214. Operational amplifiers 212 and 214 are conventional solid state amplifiers coupled to the outputs of converters 204–210 and the inputs of eight diodes in source array 12. Operational amplifiers 212 and 214 receive the sinusoidal output signals of converters 204–210 and amplify the signals to drive diodes 1–8. In the preferred embodiment, op-amps 212 and 214 are quad-amps containing four inputs and four outputs configured for driving four diodes each.

Op amp 212 receives four analog driving signals from converters 204 and 206 for driving diodes 1–4. Similarly, op amp 214 receives four analog driving signals from converters 208 and 210 for driving diodes 5–8.

The components of pattern generator 108 and array driver 110 described above selectively activate diodes 22 in source array 12 in a plurality of sequential encodement patterns and include circuitry for selectively adjusting the relative phasing of the diodes in order to eliminate centerbursts associated with constructive interference between the electromagnetic waves of the diodes. As discussed above, diodes 22 are activated in successive encodement patterns by pattern generator 108 and driver 110. In the preferred embodiment, each diode in source array 12 is driven by a sinusoidal signal with a unique frequency. EPROM 202 stores the frequency, amplitude and phase of the sinusoidal signal for each diode and outputs a digital driving signal to digital-to analog converters 204–210. In order to eliminate centerbursts associated with constructive interference between the source element signals, EPROM 202 adjusts the relative phasing of the diodes in accordance with Hadamard or Fourier transform mathematics.

EPROM 202 of the control system 20 of the present invention adjusts the relative phasing of the diodes in accordance with the elements of a Hadamard matrix. A Hadamard matrix is an N×N matrix containing "1"s and "0"s as elements. The elements of a Hadamard matrix are chosen to provide the optimal encodement patterns to the diodes of array 12 as fully discussed in Fateley U.S. Pat. No. 5,257, 086, and the book "Hadamard Transform Optics" by Martin Harwit, et al., hereby incorporated by reference.

In the preferred embodiment, the initial phase of each of the diodes in an N×N source array is set to either 180 degrees or 0 degrees in accordance with the elements of an N×N Hadamard matrix. For example, referring to FIG. 6, the elements of the first row of a 31×31 Hadamard matrix are shown in the first column, and the driving signals for a source array containing 31 diodes are shown in the second column. The phase of the driving signal for the first diode is governed by the first element in the matrix, the phase of the driving signal for the second diode is governed by the second element in the matrix, etc. Thus, each diode associated with a Hadamard element of 0 has an initial phase of 0 degrees. Alternatively, each diode associated with a Hadamard element of 1 has an initial phase of 180 degrees. In this way, the elements of the source array are not all in-phase and centerbursts are eliminated.

It has been discovered that adjusting the relative phasing of the source elements in accordance with Hadamard or Fourier transform mathematics is the most effective way to eliminate centerbursts. Hadamard matrices are designed to provide optimal multiplexing of a plurality of array elements and are equally effective at providing optimal relative phasing of a plurality of electromagnetic waves.

Figure 5:
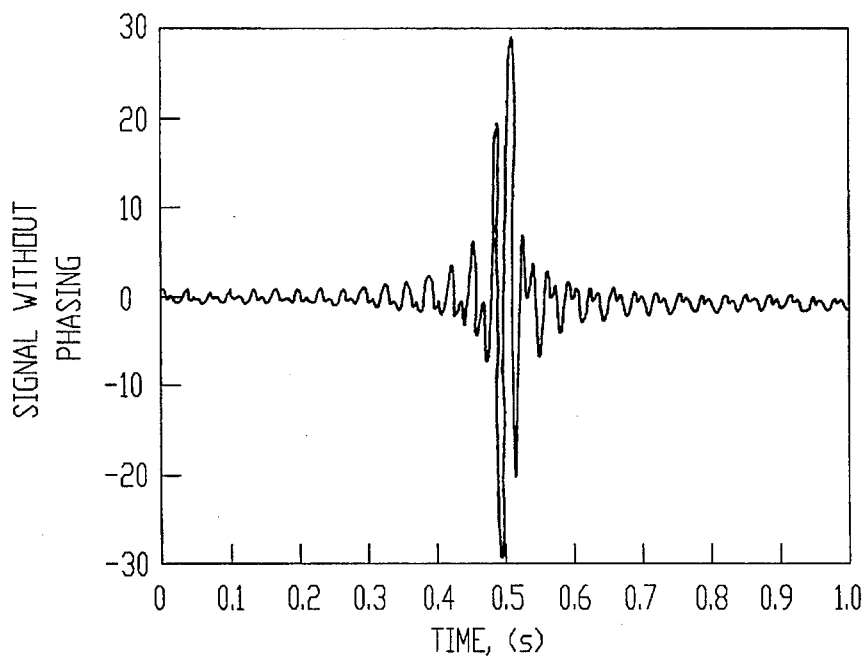
FIG. 5 is a graph of a typical output of a prior art spectrophotometer illustrating the centerburst problem.
Figure 4:
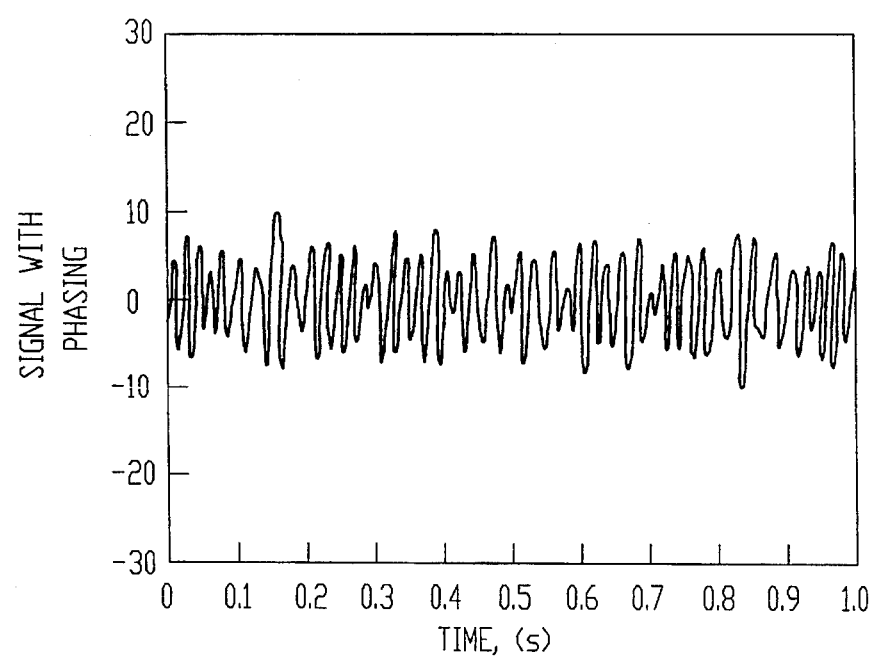
FIG. 4 is a graph of a typical output of the preferred spectrophotometer.

FIG. 4 illustrates an output signal from the preferred spectrophotometer when the relative phasing of the diodes is adjusted as described above. As seen in the figure, the amplitude of the output signal is uniform and does not contain centerbursts or amplitude peaks. In contrast, FIG. 5 illustrates an output signal from the same spectrophotometer without relative phasing. As seen in the figure, the output signal contains centerbursts. These centerbursts can saturate the detector or exceed the dynamic range of other electrical controls such as analog-to-digital converters. Moreover, when all of the source elements are energized simultaneously, the current draw on the power supply is maximized, often exceeding the output of the power supply.

In operation, spectrophotometer apparatus 10 is used to determine certain physical characteristics of a sample of material by analyzing the spectrum of wavelengths of light passing therethrough. To begin the analysis, a sample is placed in sample chamber 24, and diodes 22 are activated to emit radiation in a successive set of Hadamard or Fourier transform encodement patterns. The radiation is directed towards diffraction grating 14 which collimates and reflects the radiation towards slit assembly 16. The resultant set of spectral components passing through slit 16 is detected by detector 18 which provides signals representative thereof. Computer 100 then processes these signals to produce a Hadamard or Fourier transform analysis. Computer 100 applies the detector signals as inputs to solve a conventional Hadamard or Fourier transform algorithm that mathematically yields intensity counts in respective wavelengths that represent each of diodes 22.

Computer 100 operates according to a control program that governs the operations of spectrophotometer apparatus 10. Computer 100 initiates an analysis by prompting pattern generator 108 to activate the successive Hadamard or Fourier transform encodement patterns on array 12 by way of driver 110. More particularly, array 12 includes a plurality of diodes 22 which are driven by Hadamard or Fourier transform encodement patterns in which a different sets of diodes 22 are active and inactive during each pattern according to well known Hadamard or Fourier transform mathematics. With each pattern, a set of wavelength components are resolved by grating 14 and directed through slit 16 onto detector 18.

The components of pattern generator 108 and array driver 110 described above selectively activate the source elements in a plurality of sequential encodement patterns and include circuitry for selectively adjusting the relative phasing of the elements in order to eliminate centerbursts associated with constructive interference between the source element signals. EPROM 202 stores the frequency, amplitude and phase of the sinusoidal signal for each diode and adjusts the relative phasing of the diodes in accordance with Hadamard mathematics to eliminate centerbursts.

In the preferred embodiment, the initial phase of each of the diodes in an N×N source array is set to either 180 degrees or 0 degrees in accordance with the elements of an N×N Hadamard matrix. In this way, the elements of the source array are not all in-phase and centerbursts are eliminated.

FIG. 4 illustrates an output signal from the preferred spectrophotometer when the relative phasing of the diodes is adjusted as described above. As seen in this figure, the amplitude of the signal is uniform and does not contain centerbursts or amplitude peaks.

In synchrony with the activation of encodement patterns, computer 100 also takes readings from ADC 106. These readings enable computer 100 to solve a conventional fast Fourier transform and thereby eliminate background noise from the readings for analysis.

One complete set of encodement patterns constitutes one "scan". After one analysis is performed, computer 104 can activate slit assembly 16 to allow passage of a different set of spectral components in order to perform another analysis using these components.

As those skilled in the art will appreciate, the preferred invention as described above provides a distinct advance in the state of the art for spectrophotometers. More particularly, the spectrophotometer and method of operation described above provides for a detector with an output signal free of excessive amplitude peaks and centerbursts while providing for very rapid analysis of a sample using Hadamard or Fourier transform techniques without experiencing signal loss through mask absorption.

As those skilled in the art will appreciate, the pattern generator of the present invention can be used to eliminate amplitude peaks and centerbursts in other applications. For example, when multiplexing a plurality of periodic electromagnetic waves of different frequencies over an optical path for telecommunications applications, the multiplexed signal is subject to amplitude peaks due to constructive and destructive interference between the plurality of periodic electromagnetic waves. The pattern generator and method of operation described in detail above can selectively adjust the relative phasing of the electromagnetic waves before multiplexing in order to reduce the amplitude peaks.

As those skilled in the art will appreciate, the present invention can also be used to superpose waves of different frequencies and thereby generate an interferogram that is analogous to a Fourier-type interferogram as can be obtained for example from a Michelson interferometer, except that the present invention does not require a beam splitting device in order to develop the interferogram.

As those skilled in the art will appreciate, the present invention encompasses many variations in the preferred embodiments described herein. Having thus described the preferred embodiments of the present invention, the following is claimed as new and desired to be protected by Letters Patent.

What is claimed is:

1. A spectrophotometer apparatus comprising:

an electromagnetic radiation source array having a plurality of activatable radiation source elements configured for activation in a plurality of encodement patterns;

means for detecting radiation emitted from said elements, and for producing signals representative thereof;

structure defining an optical pathway for directing radiation from said array to said detecting means; and control means including
activating means coupled with said array for selectively activating said elements in a plurality of sequential encodement patterns, and
means coupled with said detecting means for receiving and processing said signals for producing an analysis thereof,
said activating means including generating means for generating a plurality of periodic activating signals having respective phases in order to thereby activate said elements, and phasing means for selectively adjusting the relative phases of said periodic activating signals in accordance with a predetermined pattern.

2. The apparatus as set forth in claim 1, said activating means including a pattern generator for generating sinusoidal signals representative of said plurality of sequential encodement patterns.

3. The apparatus as set forth in claim 2, said activating means further including an array driver coupled with said pattern generator and said elements for receiving said sinusoidal signals from said pattern generator and developing driving signals therefrom for activating said elements in a plurality of sequential encodement patterns.

4. The apparatus as set forth in claim 2, said pattern generator including means for adjusting the relative phasing of said elements.

5. The apparatus as set forth in claim 4, said adjusting means including means for providing each of said elements with a selected one of a plurality of phase values.

6. The apparatus as set forth in claim 5, said plurality of phase values including 0 degrees and 180 degrees.

7. The apparatus as set forth in claim 5, said adjusting means configured for providing said phase values in accordance with Hadamard encodement patterns.

8. The apparatus as set forth in claim 5, said pattern generator including memory, wherein said Hadamard encodement patterns are stored in said memory, said pattern generator configured for selecting said phase values in accordance with said stored Hadamard encodement patterns.

9. The apparatus as set forth in claim 1, said elements operable for emitting radiation in regions selected from the group consisting of visible, near infrared, infrared, and mid infrared.

10. The apparatus as set forth in claim 1, said elements including light emitting diodes.

11. The apparatus as set forth in claim 1, said control means including a computer, a pattern generator and an array driver operably configured for oscillating the energization of said elements in bursts within Hadamard pattern activations, said computer including means for digitally filtering said signals to reduce background noise therein.

12. The apparatus as set forth in claim 1, said detecting means including a detector selected from the group consisting of a photodiode, a photoresistor, and a phototransistor.

13. The apparatus as set forth in claim 1, said encodement patterns including Hadamard encodement patterns.

14. The apparatus as set forth in claim 1, said encodement patterns including Fourier frequency oscillations.

15. A spectrophotometer apparatus comprising:

an electromagnetic radiation source array having a plurality of activatable radiation source elements configured for activation in a plurality of Hadamard encodement patterns, said elements having a solid state construction;

structure defining an optical pathway for directing radiation from said array to said detector means;

a detector positioned for receiving radiation from said array and responsive thereto for producing signals representative thereof; and control means including a computer, an array driver, and an EPROM pattern generator operable for generating a plurality of periodic activating signals having respective phases for energizing said elements in an oscillating burst manner during pattern activation thereof in order to produce corresponding oscillations in said signals, said computer being coupled with said detector and operable for receiving, filtering, and processing said signals and for producing a Hadamard analysis thereof, said EPROM pattern generator including phasing means for selectively adjusting the relative phases of said periodic activating signals, said phasing means including means for providing each of said periodic activating signals with a phase of 0 degrees or 180 degrees, said phasing means configured for providing said phase values in accordance with Hadamard encodement patterns.

16. A method of spectrophotometric analysis comprising:

providing an electromagnetic radiation source array having a plurality of activatable radiation source elements configured for activation in a plurality of encodement patterns, generating a plurality of periodic activating signals having respective phases for selectively activating said elements in a plurality of sequential encodement patterns;

directing radiation from said array to a detector by way of an optical pathway;

using said detector to detect radiation emitted from said elements and for producing signals representative thereof; and said activating step further including selectively adjusting the relative phases of said periodic activating signals before directing radiation to said detector.

17. The method as set forth in claim 16, said activating step including providing a pattern generator for generating sinusoidal signals representative of said plurality of sequential encodement patterns.

18. The method as set forth in claim 17, said activating step further including providing an array driver coupled to said pattern generator and said elements for receiving said sinusoidal signals from said pattern generator and developing driving signals therefrom for activating said elements in a plurality of sequential encodement patterns.

19. The method as set forth in claim 17, said pattern generator including means for adjusting the relative phasing of said elements.

20. The method as set forth in claim 19, said adjusting means including means for providing each of said elements with a selected one of a plurality of phase values.

21. The method as set forth in claim 20, said plurality of phase values including 0 degrees and 180 degrees.

22. The method as set forth in claim 20, said adjusting means configured for providing said phase values in accordance with Hadamard encodement patterns.

23. The method as set forth in claim 20, said pattern generator including memory apparatus, wherein said Hadamard encodement patterns are stored in said memory, said pattern generator configured for selecting said phase values in accordance with said stored Hadamard encodement patterns.

24. The method as set forth in claim 16, said elements operable for emitting radiation in regions selected from the classifications consisting of visible, near infrared, infrared, and mid infrared.

25. The method as set forth in claim 16, said elements including light emitting diodes.

26. The method set forth in claim 16, said activating step including using a computer, a pattern generator and an array driver operably configured for oscillating the energization of said elements in bursts within Hadamard pattern activations, said computer including means for digitally filtering said signals to reduce background noise therein.

27. The method as set forth in claim 16, said detecting step including the use of a detector selected from the group consisting of a photodiode, a photoresistor, and a phototransistor.

28. In a method of analyzing a plurality of electromagnetic waves having different frequencies and each having a characteristic phase relative to the phases of the other electromagnetic waves, wherein said waves are selectively generated and directed as a multiplexed signal to a detector for analysis thereof, the improvement which comprises the step of selectively adjusting the phases of at least certain of said electromagnetic waves in a predetermined pattern for reducing the creation of interference—derived high magnitude amplitudes bursts.

29. The method as set forth in claim 28, including the step of providing a plurality of source elements configured for generating a plurality of periodic electromagnetic waves.

30. The method as set forth in claim 29, including the step of selectively activating set elements to generate the electromagnetic waves, wherein each of the electromagnetic waves presents a phase.

31. The method as set forth in claim 30, including the step of directing the electromagnetic waves by way of an optical pathway from said source elements to a detector in a multiplex signal, wherein said multiplex signal is subject to amplitude bursts due to constructive and destructive interference between the plurality of periodic magnetic waves.

32. The method as set forth in claim 31, including the step of receiving and processing said multiplexed signal at said detector and producing an analysis thereof.

33. The method as set forth in claim 32, including the step of selectively adjusting the relative phasing of the electromagnetic waves in accordance with Hadamard mathematics in order to reduce said amplitude bursts due to constructive and destructive interference between the electromagnetic waves.

* * * * *